United States Patent Office 3,009,956
Patented Nov. 21, 1961

3,009,956
4-EPITETRACYCLINE ANTIBIOTIC
TRANSFORMATION PROCESS
Melvin M. Noseworthy, Brooklyn, N.Y., assignor to Chas. Pfizer & Co., Inc., Brooklyn, N.Y., a corporation of Delaware
No Drawing. Filed July 15, 1960, Ser. No. 43,004
11 Claims. (Cl. 260—559)

The present invention is concerned with a process for the conversion of the 4-epimers of the tetracycline antibiotics into their corresponding diastereoisomers of normal configuration. When reference is made to the tetracycline antibiotics having the normal configuration what is meant is that form of the antibiotic having the stereochemical configuration of the product produced by fermentation. In those instances where the tetracycline analog is prepared synthetically and not by fermentation, what is meant is that diastereoisomer thereof analogous in asymmetric arrangement to fermentation tetracycline, or oxytetracycline, etc.

The stereochemical configuration of each of the asymmetric centers of the tetracycline antibiotics has not yet been firmly established. It is known, however, that the stereochemical configuration is related to the biological activity of these substances. Isomers of tetracycline and certain of its analogs having configurations the reverse of the fermentation product at the 4, 5a, and 12a-positions have been described in the literature. Each of these epimers has substantially lower antimicrobial activity than the fermentation product.

The tetracycline antibiotic epimers having the inverse configuration at the 4-carbon atom are the most commonly occurring epimers. They are known as 4-epitetracycline, 4-epioxytetracycline, etc. The common occurrence of these epimers is a result of the fact that the tetracycline antibiotics have a tendency to spontaneously equilibrate with their 4-epimers in solution at slightly acidic pH values. Thus in the course of manufacture of these antibiotics and in certain liquid pharmaceutical dosage forms, a loss in potency frequently results due to this sponstaeous isomerization. Under favorable conditions an equilibrium mixture which contains approximately 50% of each of the 4-epimers is obtained. Thus, it has not been possible to transform the substantially pure 4-epitetracyclines completely into the antibiotic having the normal configuration and vice versa without resort to difficult and costly isolation procedures to separate the desired component from the equilibrium mixture. Further, in those products which are comprised of a mixture of a tetracycline antibiotic and its 4-epimer which contain the 4-epimer in lower proportion than that of an equilibrium mixture, it has not been possible to enrich the biological activity of such products by isomerizing the 4-epimer therein to the antibiotic of normal configuration. That is to say, such equilibrium mixtures ordinarily contain 50 to 60% of the antibiotic of normal configuration, and further enrichment thereof is impossible except by physical separation of the components.

It has now been discovered that certain metal chelates or salts of 4-epitetracycline, 4-epi-6-demethyltetracycline, 4-epi-6-deoxy-6-demethyltetracycline, 4-epi-6-demethyl-7-chlortetracycline, and 4-epioxytetracycline when dissolved in a solvent therefor at the appropriate pH or hydrogen ion concentration are isomerized to the corresponding metal salt of the antibiotic of the normal configuration. Conversely, when these metal chelates or salts of the antibiotic having the normal configuration are dissolved in the same solvent, they show little or no tendency to epimerize. The latter phenomenon, of course, is not unique for the present combinations since a number of solvent systems are known in which the tetracycline antibiotics are stable and do not appreciably epimerize. However, this is to be distinguished from the present discovery which is the only instance heretofore known or encountered in which it is possible to convert the above 4-epitetracyclines into their biologically active counterparts of normal configuration without the necessity for the laborious physical separation of mixtures containing a substantial proportion of the 4-epimer as required by prior art processes.

The present process for the transformation of the 4-epimers of the tetracycline antibiotics into their isomers of the normal configuration comprises preparing a solution of either the dicalcium, tricalcium, or tristrontium chelate and dissolution thereof in a suitable solvent. The regeneration of oxytetracycline from its 4-epimer according to the present method is completed via the monomagnesium chelate thereof rather than the calcium and strontium chelates above specified. In addition, the di and trimagnesium chelates of 6-deoxy-6-demethyltetracycline are also operable in the present process. In general the tricalcium chelates are preferred reactants except, of course, with oxytetracycline. The chelate solution is then stored at 20 to 150° C. and a pH of 8.5 to 10 until substantially complete transformation of the 4-epimer into the tetracycline chelate of normal configuration has occurred.

The rate of reaction is temperature dependent, the rate increasing with temperature. The tetracycline antibiotics, of course, are all heat labile to a degree and the temperature selected for the epimerization process must be one at which decomposition of the antibiotic is not significant. One hundred fifty degrees centigrade has been found to be the upper practical limit, and 50° C. to 115° C. is the preferred range. The process is operable at temperatures as low as 20° C., but below that temperature the rate is impractically slow.

For the conversion of bulk quantities of the 4-epitetracycline antibiotics, for instance, material that accumulates as production by-product, operation at temperatures below 50° C. is impractical. At this temperature batch reaction times of several days or more are required. At room temperature reaction time for 90 to 100% conversion is prolonged to a month or more. In liquid dosage form work, however, where solutions of the calcium, strontium, or as the case may be, magnesium chelates of the tetracycline antibiotics are involved, it is quite satisfactory to formulate and package the composition in final form from 4-epimer and to then store resulting solution until biological activity is regenerated according to the present process.

Reference is made herein to the pH value of the reaction solution in the above solvents. What is meant is the pH observed when said solution is diluted with an equal volume of water. Conventional methods for the measurement of pH are not adapted to non-aqueous solutions. For convenience, the hydrogen ion concentration of the present reaction mixtures is defined in terms of pH of the mixture resulting on dilution of the reaction solution with an equal volume of water.

Various bases both inorganic and organic are suitable for adjustment of the pH of the reaction mixture. It is preferred to employ a base which is soluble in the reaction mixture. In any event a stronger base than the dimethylamino group of the tetracycline, that is one exhibiting a pKb value of less than 6.32, is required. It is preferred, however, to employ bases having pKb values of less than that of ammonia, namely, pKb 4.70. Ammonium hydroxide is operable but bases such as sodium hydroxide, potassium hydroxide, sodium acetate, potassium acetate, sodium carbonate, potassium carbonate, calcium oxide, calcium hydroxide, calcium carbonate, magnesium oxide, magnesium hydroxide, magnesium carbonate, lower alkyl and dialkylamines including hydroaliphatic nitrogen heterocycles and hydroxyl substituted derivatives thereof such as ethyl amine, diethylamine, triethylamine, trimethylamine, ethanolamine, diethanolamine, triethanolamine, ethylene diamine, piperazine, piperidine, pyrrole, butylamine, benzylamine, benzyldimethylamine, dimethylamine, propylamine, dipropylamine, etc. are preferred.

The propensity of the chelates employed in the present process to epimerize to corresponding chelate having the normal configuration does not appear to be solvent dependent since a wide variety of solvents is applicable. All reaction inert oxygenated organic solvents are believed to be operable. The essence of the present invention is the discovery that the 4-epimers of the tetracycline antibiotics when converted to certain metal chelates in solution within certain pH limits and over a wide temperature range are transformed into the corresponding tetracycline antibiotic of normal configuration. The chief criteria with regard to solvent appear to be that the chelate have appreciable solubility in the solvent, that is a solubility of at least 5 mg./ml., and that destructive side reactions between solvent and chelate do not occur, i.e., the solvent is reaction inert. If the salt has a solubility so low as to make the usual assay methods inapplicable, it is difficult to follow the course of the process. Usually the limiting factors, however, are the practical considerations. Use of solvents in which the metal salt or chelate of the 4-epitetracycline has a very low solubility requires the use of an excessive solvent volume. The selection of appropriate solvents is well within the ability of those skilled in the art.

For preparative application of the method, it is preferred to employ a solvent in which the maximum amount of the necessary chelate will dissolve. Examples of suitable solvents include liquid alkyl polyols, alkanoamides, N-alkylalkanoamides, N-hydroxyalkylalkanoamides, and the lower alkanols (1 to 5 carbon atoms). In some instances the presence of a low percentage of water, from 1 to 10%, seems to increase the rate of reaction. Preferred solvents include propylene glycol, polyethylene glycols of molecular weights up to 1000 and particularly 400, and butanol alone and containing about 5% of water on a weight basis. Anhydrous methanol seems to be somewhat less satisfactory, but its performance is improved when it contains a small amount of water.

The liquid aliphatic acid amides also appear to be generally applicable. When reference is made herein to liquid amides, polyols, alkanols, etc. what is meant is a compound that is liquid at the desired reaction temperature. The liquid amides suitable as solvents for the present process are primarily those of formic, acetic, and propionic acid and the hydroxylated derivative thereof such as glycolic and lactic acid amides. Examples of suitable amides include N,N-diemthylformamide, N,N-dimethylacetamide, N-(β-hydroxyethyl)acetamide, N-ethyllactamide, N-(β-hydroxyethyl)lactamide, N-(β-hydroxyethyl)glycolamide, etc.

It has been pointed out that it is desirable to employ the highest antibiotic salt concentration possible to conserve on the quantity of solvent necessary to convert a given quantity of the 4-epitetracycline or 4-epioxytetracycline salt to that of the normal configuration. The above solvents permit concentration of up to about 90 mg./ml. of tricalcium 4-epitetracycline 150 mg./ml. of monomagnesium 4-epioxytetracycline, and 130 mg./ml. of tricalcium 4-epi-6-deoxy-6-demthyltetracycline.

A preferred method for carrying out the present process, is to form the respective metal chelate in situ. This is done by dissolving the 4-epitetracycline antibiotic either in crude or purified form in an appropriate quantity of the desired solvent and adding to this at least two or three molecular proportions of a solvent soluble calcium salt in the cases of 4-epitetracycline, 4-epi-6-demethyltetracycline, 4-epi-6-demethyl-6-deoxytetracycline, and 4-epi-6-demethyl-7-chlortetracycline, one molecular proportion of a solvent soluble magnesium salt in the case of 4-epioxytetracycline, or at least three molecular proportions of a solvent soluble strontium salt in the case of each of these 4-epitetracyclines other than 4-epioxytetracycline. With 4-epi-6-deoxy-6-demethyltetracycline two or three molecular proportions of a solvent soluble magnesium salt may also be used for in situ formation. Except in the case of oxytetracycline, an excess of calcium, strontium or magnesium salt over the amount specified is not ordinarily deleterious. Greater than three or four-fold excess may, however, effect solvent volumes and product recovery.

The anion of the salt selected, of course, must be compatible with the tetracycline antibiotic component. By that is meant the anion must be neither such a strong oxidizing nor strong reducing agent when dissolved in the solvent as to result in destruction of the antibiotic. Tetracycline and oxytetracycline compatible anions include the halides, and especially the chlorides and bromides, nitrate, formate, acetate, and iodide, as well as other organic and inorganic anions such as propionate, butyrate, citrate, salicylate, sulfocarbolate, benzilate, lactate, dithionate, ferricyanide, ferrocyanide, cyanide, nitrate, hydrosulfite, thiocyanate, thiosulfate, fluoride, hydroxide, sulfate, tartrate, carbonate, bicarbonate, etc. complex salts such as magnesium ammonium chloride and magnesium ammonium sulfate are also operable as, of course, are the oxides, alkoxides, and hydroxides and similar calcium and strontium salts.

For some purposes, recovery of the antibiotic from the reaction solution at the conclusion of the process is not necessary. For example solutions of the antibiotic are frequently employed in the therapeutic administration thereof by both the parenteral and oral routes. The calcium and magnesium tetracycline and oxytetracycline salts or chelates disclosed herein are pysiologically acceptable as are a number of the solvents. Such compositions can thus be prepared employing the present process with the pure 4-epi forms of the antibiotics or from mixtures containing the antibiotic and its 4-epimer. This latter feature, i.e. uses of antibiotic mixtures containing substantial amounts of 4-epimer, is perhaps one of the most important applications of the present process not only in the preparation of pharmaceutical compositions but also in the manufacture of the antibiotics per se.

The 4-epimers of the tetracycline antibiotics are rarely encountered in pure form since the epi-normal equilibrium does not appear to substantially favor one form over the other. According to the present method, it is possible to upgrade the biological activity of crude samples of tetracycline and oxytetracycline containing a substantial proportion of the 4-epimer. It is not usually considered economically advantageous to recover the antibiotic activity obtainable from the 4-epimers in tetracycline mixtures containing less than 5% thereof, however. In samples of the antibiotic containing greater than this concentration of 4-epimer, however, it is advantageous to transform the 4-epitetracycline antibiotic contained therein to that of the normal configuration by means of the present method. This is one of the unique advantages of this present method.

When it is desired to recover the tetracycline antibiotic, from the reaction mixture this is most conveniently achieved by adding to the solution resulting from the present process a material that results in precipitation of the antibiotic or salt thereof. Non-solvents for the antibiotic or its metal salt are the most convenient precipitants. Of these, water is the non-solvent which has been used most widely in the precipitation of tricalcium tetracycline since it has very limited water solubility. It has been found for instance when using propylene glycol as the reaction solvent with tricalcium 4-epitetracycline that the presence of more than 20% by weight of water in the solvent results in precipitation of the metal salt. Thus, with propylene glycol the reaction solvent must contain less than 20% water, and for the recovery of tricalcium tetracycline from the solvent at the completion of the process the addition of water in excess of 20% by weight concentration results in precipitation of the antibiotic salt. About 1–5 volumes of water are usually employed to insure complete precipitation. Other solvents miscible with the reaction solvent but in which these antibiotics are not soluble include ether, acetone, and various other organic solvents. Occasionally combinations of lower alkanols such as butanol-methanol, butanol-isopropanol afford satisfactory reaction-precipitation systems. Other precipitants, of course, can be employed which depend upon the conventional salting out effect for their operation such as various inorganic and organic salts and other compounds which have a high solubility in the reaction solvent.

The course of the process is readily followed by assaying the reaction solution by both spectrophotometric and biochemical method. Methods for carrying out these assays have been described in a volume by D. C. Grove and W. A. Randall entitled "Assay Methods of Antibiotics, Laboratory Manual, Antibiotics Monograph II" Medical Encyclopedia, Inc., 1955. A comparison of the assay results obtained by the biochemical and spectrophotometric methods is very useful since the spectrophotometric method does not distinguish between the tetracycline antibiotics and their respective 4-epimers. The spectrophotometric assay then represents the total of the tetracycline and its 4-epimer in a given sample. 4-epitetracycline and 4-epioxytetracycline, however, have exceedingly low biological activities when measured by the conventional $K.$ $pneumoniae$ turbidimetric method. The biological assay of 4-eptitetracycline is only about 13% that of tetracycline and that of 4-epioxytetracycline is less than 10% that of pure oxytetracycline. The biological assay figure then represents primarily the tetracycline or normal configuration in the sample. From the two assay values, the proportion of 4-epimer in any given sample of tetracycline or oxytetracycline can, therefore, be estimated by simple calculations.

The time necessary to complete the present process in any given situation is determined by periodically measuring biological and spectrophotometric assay values. The process is complete when the biological assay value is substantially equal to the spectrophotometric assay value, bearing in mind the limit of precision in determing biological assays is about ±10%. The time required for essentially complete conversion to occur is effected by a number of variables. Periods of from ½ hour to a month or more have been observed. For preparative purposes conditions (usually a temperature of 50° C. or higher) permitting essential completion of the reaction (90% or more tetracycline antibiotic of normal configuration) in from about ½ hour to four or five days are preferred.

The spectrophotometric method of assay depends upon the absorption of light in the ultra-violet region by a solution of the antibiotic. The wave length seleced is one at which both of the normal and 4-epi forms of the tetracycline antibiotic absorb to the same extent. Methods conventionally employed with tetracycline and oxytetracycline involve measurement of the absorption at 380 m$\mu$ employing 0.01 N sodium hydroxide as the solvent, or at 430 m$\mu$ employing 0.02 N methanolic hydrochloric acid as solvent, after heating the test solution on a steam bath for 5 minutes. The latter conditions result in formation of the 5a,6-anhydro compound from tetracycline or oxytetracycline mixtures. Certain other wavelengths are also suitable and may be selected.

Chromatographic methods are also available for the quantitative estimation of the amounts of a tetracycline antibiotic and its 4-epimers in mixtures thereof. This is due to the fact that the 4-epimers exhibit different Rf values than do the corresponding tetracyclines of normal configuration in papergrams prepared using various solvent systems.

The following examples are provided to illustrate specific methods for operating the present invention. They are not to be considered as limiting the scope thereof in any way.

*Example I*

Ten and four tenths grams of an antibiotic sample comprised primarily of 4-epitetracycline hydrochloride is dissolved in 393.68 g. of propylene glycol. A solution of 7.06 g. of calcium chloride in 8 ml. of water is then added thereto. The solution is thoroughly mixed and 6 ml. of β-hydroxyethylamine added thereto. An aliquot of the solution is removed, mixed with an equal volume of water, and the pH value determined. The pH is found to be 8.5. This solution is then assayed by the spectrophotometric method described herein and found to have a value corresponding to 22.6 mg./ml. of tetracycline. The value obtained by the $K.$ $pneumoniae$ bioassay, indicates a tetracycline concentration of less than 4 mg./ml. Assay by papergram indicates that the solution contains 16.8 mg./ml. of 4-epitetracycline and 1.5 mg./ml. of tetracycline. The solution is then kept at 37° C. and periodically assayed by the spectrophotometric and biological methods. At the end of thirty days, the biological assay is 25.6 mg./ml. and the spectrophotometric assay is 24.5 mg./ml. Determination by paper chromatography indicates that the solution contains 19.3 mg./g. of tetracycline and 1.0 mg./g. of 4-epitetracycline. It is concluded that in excess of 95% of the 4-epitetracycline originally contained in the solution has been converted to tetracycline.

The chromatographic analysis of the mixture involves the preparation of a papergram on a Whatman No. 1 filter paper sheet 7″ wide and 22″ long. The paper is moistened with the following solution which then constitutes the immobile phase; 500 ml. 0.1 N citric acid, 208 ml. 0.2 N disodium phosphate containing approximately 10 mg. of sodium benzoate as a preservative and saturated with a solvent mixture made up to 20 parts by volume nitromethane, 10 parts by volume chloroform, 3 parts by volume pyridine. The papergram is then developed in descending fashion employing as the mobile phase the above mixture of organic solvents saturated with the citrate-phosphate buffer solution serving as immobile phase. From 0.1 to 0.2 ml. of the test solution containing a known weight of the antibiotic sample (approximately 0.5 mg.) is employed. The tetracycline is located at approximately Rf 0.45 and the 4-epitetracycline at Rf 0.10. The precise location is determined by comparison to a known sample carried in a parallel run. These respective areas are excised and the antibiotic eluted from the paper with 50 ml. of 0.01 N hydrochloric acid. The amount of antibiotic in each area corresponding to these Rf values is then determined by spectrophotometric assay at 355 m$\mu$ using $$E_{1\ cm.}^{1\%} = 301$$

for tetracycline and epitetracycline.

*Example II*

A solution containing 20.4 g. of tetracycline hydrochloride, 4.71 g. of anhydrous calcium chloride, 4.17 g. α-monothioglycerol (Thiovanol Evans Chemetic Inc., New York, New York), 4.0 g. sodium formaldehyde sulfoxylate, and 10 ml. of water and sufficient propylene glycol to afford a total volume of 800 ml. is prepared. The mixture is adjusted to pH 6.0 with monoethanolamine and kept at room temperature for 27 days. This results in the in vitro formation of a substantial proportion, about 56% of the total antibiotic content, of tricalcium 4-epitetracycline in the reaction solution. The pH of the mixture is then adjusted to 8.5 and the solution kept at 37° C. for an additional 16 days. This results in substantially complete regeneration of the original biological activity of the solution due to the transformation of the tricalcium 4-epitetracycline into tricalcium tetracycline of the normal configuration. The observed assay values are tabulated below.

| pH | Day | Spectrophotometric Assay | Biological Assay |
|---|---|---|---|
| 6 | 0 | 24.0 | 23.9 |
| 6 | 9 | 23.0 | 16.3 |
| 6 | 27 | 23.1 | 11.2 |
| adjust to pH 8.5 on 27th day | | | |
| 8.5 | 33 | 26 | 16.0 |
| 8.5 | 37 | 20.1 | 22.5 |
| 8.5 | 49 | 21.2 | 23.1 |

*Example III*

The process of Example I is repeated substituting 10.8 g. of 4-epioxytetracycline hydrochloride for the 4-epitetracycline hydrochloride and 4.3 g. of magnesium chloride hexahydrate for the calcium chloride employed in that example. Complete regeneration of the oxytetracycline activity occurs.

The chromatographic assay of mixtures of 4-epioxytetracycline and oxytetracycline is carried out as described in Example I. In this instance, 4-epioxytetracycline concentrates at Rf 0.02 and oxytetracycline at Rf 0.19. Again controls employing authentic samples are run side-by-side for precise location of these components on the papergram. The spectrophotometric assay involves ultraviolet light absorption at 353 mμ using $$E_{1\ cm.}^{1\%} = 305$$

for oxytetracycline.

*Example IV*

The process of Example I is repeated, 100 g. of propylene glycol as solvent rather than the amount specified therein. Complete conversion of the 4-epitetracycline hydrochloride into biologically active tetracycline salt was observed in the course of a 25 day period.

*Example V*

The process of Example III is repeated employing 65 g. of propylene glycol as solvent. Substantially the same results are obtained.

*Example VI*

The process of Example I is repeated employing the following liquids as solvent in place of propylene glycol: ethylene glycol, glycerol, hexamethylene glycol, dimethylacetamide, N-(hydroxyethyl)lactamide, N,N-dimethylformamide, N-(β-hydroxyethyl)lactamide, polyethylene glycol of molecular weight 400, polyethylene glycol of molecular weight 600, formamide, and polyethylene glycol of molecular weight 1000. Essentially the same results are obtained.

*Example VII*

A solution of the following composition is prepared

| Component: | Grams/200 ml. |
|---|---|
| 4-epitetracycline | 5.23 |
| Calcium chloride, anhyd. | 3.78 |
| Monoethanolamine to pH 8.5 | 1.5 |
| Sodium formaldehyde sulfoxylate | 0.6 |
| α-Monothioglycerol | 2.4 |
| Propylene glycol | 190.6 |
| Water | 6.5 |

The calcium chloride is dissolved in the water. The 4-epitetracycline is suspended in the propylene glycol and with constant stirring under an atmosphere of nitrogen gas, the calcium chloride solution is added thereto. The pH is then adjusted to 8.5 employing the monoethanolamine. The sodium formaldehyde sulfoxylate and α-monothiogcerol are then added, and the solution is subdivided among a number of 2 ml. glass ampoules which are sealed. A portion of the ampoules is then placed in a 100° C. oven, a second portion in a 75° C. oven, and a third portion in a 50° C. oven. The initial assay values of the solution indicate a biological assay of 4.9 mg./ml. of tetracycline and a spectrophotometric assay of 24.0 mg./ml. (total of tetracycline and 4-epitetracycline).

Ampoules are then removed from the 100° C. oven at hourly intervals and the assay values determined. Employing both the biological, spectrophotometric, and chromatographic assays, it is determined that approximately 90% of the 4-epitetracycline is converted to tetracycline in the first two hours and approximately 95% in the first four hours.

Ampoules from the 75° C. oven are assayed at two hourly intervals. It is determined that the 83% of the 4-epitetracycline originally present is converted to tetracycline in six hours and approximately 89% thereof in twenty-four hours.

Ampoules from the 50° C. oven are removed at four hourly intervals and assayed. It is estimated that approximately 80% of the 4-epitetracycline originally present is converted to tetracycline during the first 48 hours.

*Example VIII*

The process of Example I is repeated employing a temperature of 20° C. for the storage period. Essentially complete conversion of the 4-epitetracycline again takes place, but a period of several months is required.

*Example IX*

The process of Example I is repeated employing the following substances to adjust the pH of the reaction mixture, sodium hydroxide, potassium hydroxide, sodium acetate, potassium acetate, sodium carbonate, potassium carbonate, calcium oxide, calcium hydroxide, strontium oxide, calcium carbonate, magnesium oxide, magnesium hydroxide, magnesium carbonate, ethylamine diethylamine, triethylamine, trimethylamine, ethanolamine, diethanolamine, triethylamine, ethylenediamine, piperazine, piperidine, pyrrole, butylamine, benzylamine, benzyldimethylamine, dimethylamine, propylamine, dipropylamine, etc.

*Example X*

A process for Example I is repeated at a pH of 10.0. In this instance, it is observed that a somewhat shorter reaction period is required for regeneration of the tetracycline activity.

*Example XI*

Two hundred milliliters of the propylene glycol reaction solution obtained in Example I is added in a dropwise fashion to 1 liter of water. The precipitated product is collected on a filter under a nitrogen atmosphere. It is washed and then dried in vacuo. The resulting tricalcium salt is suspended in anhydrous methanol and treated with seven molecular proportions of concentrated hydrochloric acid with external cooling in an ice bath. Tetracycline hydrochloride of the normal configuration precipitates. It is collected, washed with ice cold water, then with acetone, and dried in vacuo.

*Example XII*

Two hundred milliliters of the propylene glycol solution obtained in Example I is mixed with an equal volume of acetone. The tetracycline precipitates as a calcium salt which is collected on a filter and treated in the same fashion as described in Example XI. In this instance, the aqueous slurry is adjusted to pH 3.0 resulting in the precipitation of amphoteric tetracycline of high purity.

*Example XIII*

In a solvent mixture of 75 ml. ethanol and 25 ml. water there is suspended 10 g. of 4-epitetracycline base and three molecular proportions of calcium hydroxide. The mixture is shaken mechanically at room temperature for one week. The solution froths and takes on a soapy appearance. At the end of the mixing period, the mixture is evaporated to dryness providing tricalcium 4-epitetracycline. In a similar fashion the dicalcium and tristrontium salts of 4-epitetra-6-demethyl-7-chlortetracycline, and 4-epi-6-deoxy-6-demethyltetracycline are prepared.

The tricalcium 4-epitetracycline is then dissolved in propylene glycol at a concentration of 5 mg./ml., the pH is adjusted to 9.5 with sodium hydroxide and the concentrated aqueous solution kept at room temperature for one week. At the end of this period, the spectrophotometric and biological assay values are substantially identical indicating complete conversion of the 4-epitetracycline, to tetracycline. The mixture is poured into water as previously described and the calcium salt of tetracycline is recovered. The other calcium and strontium antibiotic salts referred to in this example are converted in similar fashion.

*Example XIV*

In a solvent mixture comprised of 75 ml. of ethanol and 25 ml. of water, 10 g. of 4-epioxytetracycline base is suspended. One molecular proportion of magnesium hydroxide is added thereto and the mixture is shaken mechanically at room temperature for one week. At the end of this period, the solvent is evaporated yielding a residue consisting of monomagnesium 4-epioxytetracycline. In similar fashion employing two or three molecular proportions of magnesium hydroxide the di and trimagnesium salts of 4-epi-6-deoxy-6-demethyltetracycline are prepared.

The monomagnesium 4-epioxytetracycline is then dissolved in propylene glycol at a concentration of 150 mg./ml., the pH of the mixture adjusted to 10.0 with benzylamine, and the solution kept at room temperature for approximately two weeks. At the end of this time, the spectrophotometric and biological assay values are substantially the same indicating essentially complete conversion of the 4-epioxytetracycline into biologically active oxytetracycline. The oxytetracycline is recovered as the hydrochloride salt by precipitation of the magnesium salt thereof with acetone, and acidification as previously described. The other magnesium salts referred to in this example are converted in similar fashion.

*Example XV*

The process of Example I is repeated substituting for the calcium chloride employed therein a corresponding molecular amount of the following salts: calcium bromide, calcium nitrate, calcium formate, calcium acetate, calcium propionate, calcium butyrate, calcium citrate, calcium salicylate, calcium sulfocarbolate, calcium benzilate, calcium lactate, calcium dithionate, calcium ferricyanide, calcium ferrocyanide, calcium cyanate, calcium nitrate, calcium hydrosulfite, calcium thiocyanite, calcium thiosulfate, calcium chloride, calcium hydroxide, calcium tartrate, strontium chloride, strontium bromide, strontium lactate, strontium monosulfide, strontium tetrasulfide, etc. Substantially the same results are obtained.

*Example XVI*

The procedure of Example III is repeated substituting the following salts for the magnesium chloride hexahydrate employed therein: magnesium bromide, magnesium nitrate, magnesium hydrosulfite, magnesium thiocyanide, magnesium nitrate, magnesium hydrosulfite, magnesium thiocyanide, magnesium thiosulfate, magnesium fluoride, magnesium hydroxide, magnesium sulfate, magnesium tartrate, magnesium ammonium chloride, and magnesium ammonium sulfate. Substantially the same results are obtained.

*Example XVII*

An antibiotic sample weighing 30.47 g. and containing, on the basis of a quantitative paper chromatographic analysis, 7.2% 6-demethyl-7-chlortetracycline, 65.0% 4-epi-6-demethyl-7-chlortetracycline, 17.7% 6-demethyltetracycline, 5.1% 4-epi-6-demethyltetracycline, and the balance inert impurities is disoslved in 375.84 g. of propylene glycol. The solution is rapidly stirred in an atmosphere of nitrogen while a solution of 15.49 g. of calcium chloride in 93.96 g. of water is added thereto. Monoethanolamine, 12.56 g., is then employed to adjust the pH to 8.5. Sodium formaldehyde sulfoxylate, 2.63 g., is then dissolved in the solution to serve as a preservative. The solution, totaling 500 ml. in volume, is then subdivided among a number of 2 ml. ampoules. The initial bioassay of the solution corresponds to 20.87 mg. of tetracycline activity per milliliter. Since regeneration of 6-demethyltetracyclines of normal configuration from the 4-epi forms commences at once, it is likely that this initial bioassay value does not reflect the true value for the starting antibiotic before dissolution in the reaction solvent. The ampoules are then divided into three portions, one of which is placed in an oven in 100° C., the second of which is placed in an oven at 75° C., and the third of which is placed in an oven at 50° C. The biological assays for 6-demethyl-7-chlortetracycline and 6-demethyltetracycline are conducted by the *K. pneumoniae* turbidimetric method described by R. C. Kersey for oxytetracycline (J. Amer. Pharm. Assoc., Scientific Edition, vol. XXXIX, May 5, 1950, pp. 252-253) employing appropriate standard samples. Results are reported on the basis of mcg./mg. for solid samples and mg./ml. of ml./g. for solutions. The pure antibiotics afford values of 1000 mcg./mg. in the assay.

Conversion of the 4-epi forms of the tetracycline antibiotics in this solution is essentially complete after 1½ hours at the 100° C. temperature. Approximately 6-8 hours is required for regeneration of the normal form of the 4-epitetracycline antibiotics contained therein at the 75° C. temperature. Approximately four days is required for 90% conversion in the 50° C. oven.

The quantitative paper chromatographic analysis of antibiotic samples containing 6-demethyl-7-chlortetracycline and 6-demethyltetracycline and their 4-epimers is conducted according to the technique outlined in Example I hereof. In the solvent system specified therein, 6-demethyl-7-chlortetracycline exhibits an Rf value of 0.37 and 4-epi-6-demethyl-7-chlortetracycline an Rf value of 0.12. For elution of the sample from the subdivided papergram, 0.01 N aqueous hydrochloric acid is employed. A wave length of 3.66 mμ is employed for the spectrophotometric assay. In the same assay, 6-demethyltetracycline exhibits an Rf value of 0.20 and its 4-epimer, Rf 0.07. Elution of 6-demethyltetracycline and its 4-epimer from the excised papergram is conducted in the same fashion employing a wave length of 345 mμ for the spectrophotometric assay. As usual, parallel control samples are run simultaneously for precise location of the components.

*Example XVIII*

The process of Example XVII is repeated substituting sufficient n-butanol containing 5% water to provide 250 ml. of solution for the propylene glycol specified therein which provides in that example 500 ml. of solution. At reflux temperature (108° C.) conversion of the 4-epi-6-demethyltetracycline and 4-epi-6-demethyl-7-chlortetracycline to their counterparts of normal configuration requires about 1½ hours. At 50° C. centigrade four days is required for conversion of the 4-epimers to normal 6-demethyltetracyclines. Further ampoules stored at room temperature (20-25° C.) exhibit gradual regeneration of the highly active antibiotics of normal configuration over a period of three to four months.

It is thus apparent that temperatures in excess of 50° C. are preferable for preparative work, but that for pharmaceutical dosage forms room temperature is adequate so long as flow of the packaged product into disturbation channels is properly timed with reanalysis prior to release.

Example XIX

To illustrate a preparative example, 20.48 g. of a 6-demethyltetracycline antibiotic sample of the following composition and having a bioassay of 116 mcg./ml. is dissolved in sufficient butanol to provide a final solution concentration of 100 mg./ml. of antibiotic.

| Sample composition: | Percent |
| --- | --- |
| 6-demethyl-7-chlortetracycline | 7.2 |
| 4-epi-6-demethyl-7-chlortetracycline | 65.0 |
| 6-demethyltetracycline | 19.7 |
| 4-epi-6-demethyltetracycline | 5.1 |
| Total 6-demethyltetracyclines | 97.0 |

Three molecular proportions of calcium chloride is dissolved in 5% by weight (based on butanol) of water and then added to the butanol solution of antibiotic. The mixture is refluxed for 6 hours and insoluble material filtered, precipitate weight 4.65 g., bioassay 229 mcg./ml. (corresponding to 1.35 g. of regenerated 6-demethyltetracyclines, 6.8% of the original charge).

The filtrate is concentrated to dryness providing 22 g. of the calcium salt of 6-demethyltetracyclines having a bioassay of 590 mcg./mg. (equivalent to 12.8 g. of regenerated 6-demethyltetracyclines, 64.7% of the original charge). The proportion of 6-demethyltetracyclines in the product of normal configuration is, therefore, increased to 72.5% from an original value of 26.9%.

Ten grams of this calcium salt is dissolved in 35 ml. of methanol and 3 ml. of conc. hydrochloric acid is added thereto. Crystalline hydrochloride salt having a bioassay of 701 mcg./mg. of tetracycline activity weighing 3.5 g. is collected. Additional crystalline product is recovered by partial evaporation of the filtrate. Composition of first crop material by quantitative papergram analysis.

| | Percent |
| --- | --- |
| 6-demethyl-7-chlortetracycline | 81.4 |
| 4-epi-6-demethyl-7-chlortetracycline | 4.7 |
| 6-demethyltetracycline | 11.3 |
| 4-epi-6-demethyltetracycline | Trace |

Example XX

A solution of composition shown having antibiotic concentration 25 mg./ml. (100% basis by spectrophotometric assay) is prepared by the following procedure.

| Component: | Grams/200 ml. |
| --- | --- |
| 4-epi-6-demethyl-6-deoxytetracycline | 6.66 |
| Magnesium chloride·6H$_2$O | 6.31 |
| Monoethanolamine | 2.86 |
| Sodium formaldhyde sulfoxylate | 1.18 |
| Propylene glycol | 157.4 |
| Water | 38.0 |

The 4-epi-6-demethyl-6-deoxytetracycline starting material has a bioassay of 250 mcg./mg. (*B. cereus* plate assay; basis 1000 mcg./mg. for 100% material). By paper chromatography analysis the sample is found to comprise 18.8% 6-demethyl-6-deoxytetracycline and 51.4% 4-epi-6-demethyl-6-deoxytetracycline. Allowing for 25% inert impurities (basis of spectrophotometric assay), each milliliter of original solution therefore contains 17.1 mg. of 4-epi-6-demethyl-6-deoxy- and 6.3 mg. of 4-epimer thereof. For the preparation of analytical papergrams, the solvent system 20:3 toluene-pyridine saturated with water is employed as the mobile phase with Whatman No. 4 paper (7" x 22" sheets) saturated with aqueous citrate-phosphate buffer having pH 4.2 as immobile phase. In this system 6-demethyl-6-deoxytetracycline exhibits Rf 0.47 and its C-4 epimer Rf 0.30. Elution of the subdivided papergram after development with 0.1 N methanolic hydrochloric provides a solution of the antibiotic component which is diluted ten fold and assayed spectrophotometrically by measurement of $E_{1\ cm.}^{1\%}$ at 345 mµ and comparison thereof with appropriate standard solutions.

Continuing now with the procedure, the 4-epi-6-demethyl-6-deoxytetracycline is suspended in the propylene glycol and a solution of the magnesium chloride in the water is added thereto with stirring under an atmosphere of nitrogen. The solution is adjusted to pH 8.5 with the monoethanol amine and the sodium formaldehyde sulfoxylate dissolved therein. The solution is clarified by filtration and subdivided among 2 ml. ampoules. The initial bioassay of the solution measured at this stage is 12 mg./ml. of antibiotic activity. The ampoules are then distributed among three ovens, heated at constant temperatures of 100° C., 75° C., and 50° C. and selected ampoules then analyzed at hourly intervals.

The solution contained in the 100° C. oven is found to be essentially at equilibrium (i.e. equilibrium between 4-epi and normal forms) after 1 hr.; bioassay 24.0 mg./ml.; quantitative papergram analysis 15.5 mg./ml. of 6-demethyl-6-deoxytetracycline asmple 67% of normal configuration representing transformation of 55% of the 4-epimer thereof in the original sample.

Approximately 6 hours is required to attain equilibrium at 75° C. after which time the material exhibits a bioassay of 23.6 mcg./ml.; quantitative papergram analyses 15.7 mg./ml. 6-demethyl-6-deoxytetracycline and 6.8 mg./ml. of 4-epimer thereof providing a product substantially the same as that from the 100° C. oven.

At the 50° C. temperature, approximately 24 hours is required to establish equilibrium yielding a sample containing 14.5 mg./ml. of 6-demethyl-6-deoxytetracycline and 6.7 mg./ml. of 4-epimer thereof.

Example XXI

A solution having the following composition is prepared as follows.

| Component | Grams/200 ml. |
| --- | --- |
| 4-epi-6-demethyl-6-deoxytetracycline [1] | 26.6 |
| Calcium chloride, anhydr | 15.9 |
| Monoethanolamine | 9.9 |
| Water | 10.0 |
| Butanol sufficient to provide | 200.0 |

[1] Having same composition as that in Example XX; 19.9 g. on 100% basis (spectrophotometric assay).

The mixture is refluxed for 4 hours and the hot solution filtered to remove insoluble material, which weighs 0.9 g. and has a bioassay of 389 mcg./mg. accounting for 0.358 g. of the starting material on the basis of the spectrophotometric assay thereof. The filtrate (174 ml.) is assayed biologically as indicated in Example XX and found to contain 107,800 mcg./ml. of antibiotic activity corresponding to 18.76 g. of the original charge on basis of the spectrophotometric assay thereof. The total biological activity corresponds therefore to 19.12 g. of 6-demethyl-6-deoxytetracycline or 95.8% of the total of 6-demethyl-6-deoxytetracycline and 4-epimer thereof contained in the crude sample charged.

For isolation of the antibiotic from the reaction solution, 75 ml. of the butanolic filtrate is warmed with 5 g. of decolorizing carbon for 30 min., the carbon filtered, and 15 ml. of conc. hydrochloric acid added to the filtrate, and the mixture allowed to cool with the crystallization of 6-demethyl-6-deoxytetracycline hydrochloride weighing 7.1 g. and having a bioassay of 843 mcg./mg. constituting recovery of 74% of active antibiotic in the 75 ml. aliquot of solution treated.

Example XXII

When methanol is used as solvent replacing butanol in the procedure of Example XXI, it is advisable to employ an autoclave as reaction vessel to permit temperatures higher than that obtainable by refluxing. At 100–110° C. essentially the same results as in Example XXI are obtained, but at reflux temperature (67° C.) a considerably longer reaction period is required, ca. 24 hours.

Similar modification is recommended also with ethanol or isopropanol as solvent. Further, in the case of isopropanol a substantially larger volume of a solvent is required (from 4 to 20 fold) than when employing butanol.

*Example XXIII*

The following materials are dissolved in 500 ml. of U.S.P. glycerine in the order given.

| | |
|---|---|
| Sodium cyclamate | 10.0 g. |
| Calcium acetate.H₂O | 29.68 g. |
| 4-epitetracycline hydrochloride | 27.55 g. |
| Triethanolamine | 25.0 ml. |
| 10% sodium hydroxide in glycerine | Sufficient to provide pH 9.0. |
| Glycerine | Sufficient to dilute to 1 liter. |

This solution is then sterilized by filtration to a bacteriological filter and subdivided among sterile 2 ml. glass ampoules which are then sealed. This precipitation after storage at room temperature is about three months for suitable use in tetracycline antibiotic therapy by the intramuscular route. During this period, approximately 95% of the 4-epitetracycline hydrochloride is converted to tetracycline hydrochloride. Bioassays should be conducted at intervals to determine the precise time at which maximum potency is obtained.

The present method can be readily adapted to the preparation of the active form of tetracycline analogs bearing substituents in various positions such as the 2, 5, 6, 7, 8, 9, 11a, and 12a positions from the 4-epimers thereof. Simple experiments involving measurement of spectrophotometric and bio, or chromatographic assays of solutions of calcium, strontium, or magnesium chelates thereof as described herein will be obvious to those skilled in the art. Proceeding in such fashion the following antibiotics can be prepared:

2-decarboxamido-2-acetyltetracycline
2-decarboxamide-2-acetyloxytetracycline
6-deoxy-6-demethyl-6-methylenetetracycline
7-nitro-6-deoxy-6-demethyltetracycline
6-deoxy-6-demethyl-6-methyleneoxytetracycline
6-deoxy-6-demethyl-6-methylene-11a-chlorotetracycline
7-chlortetracycline
7-iodo-6-deoxy-6-demethyltetracycline
7-fluoro-6-deoxy-6-demethyltetracycline
9-fluoro-6-deoxy-6-demethyltetracycline
6-demethyl-6,12a-dideoxytetracycline
7-amino-6-deoxy-6-demethyltetracycline
9-amino-6-deoxy-6-demethyltetracycline

*Example XXIV*

A sample of the crystalline free base form of 6-demethyl-6-deoxytetracycline weighing 325 g. and assaying 90% 6-demethyl-6-deoxytetracycline of the normal configuration, i.e. the biologically active form analogous to normal tetracycline in stereochemical structure, and 8% of the 4-epimer thereof is suspended in 2 l. of butanol saturated with water. Anhydrous calcium chloride, 333 g., is added thereto and the pH adjusted to 8.5 with monoethanolamine. The antibiotic dissolves upon addition of the calcium chloride and mixing, and a dark colored aqueous phase of small volume separates. The aqueous phase is removed and discarded. The butanol solution is treated with decolorizing carbon and filtered. To this solution is then added 150 ml. of 25% aqueous calcium chloride, 1 g. of propyl gallate and 1 g. of sodium formaldehyde sulfoxylate. The solution is refluxed in a nitrogen atmosphere for 2 hours and then cooled to room temperature. The cooled solution is adjusted to pH 1.0 with concentrated hydrochloric acid and sufficient water is added thereto to dissolve calcium chloride which precipitates in the course of the acidification. Crystalline 6-demethyl-6-deoxytetracycline hydrochloride precipitates. It is collected, washed on the filter with butanol saturated with water and finally with a small volume of ethanol. The product so obtained weighs 324.5 g. and is pale-yellow in color. It has a biological assay of 950 mcg./mg. and is found by paper chromatographic assay to be comprised of 97% 6-demethyl-6-deoxytetracycline and 1.6% 4-epi-6-demethyl-6-deoxytetracycline.

What is claimed is:

1. The process which comprises dissolving at least about 5 mg./ml. of a 4-epitetracycline antibiotic selected from the group consisting of the dicalcium, tricalcium, and tristrontium chelates of 4-epitetracycline, 4-epi-6-demethyltetracycline, 4-epi-6-deoxy-6-demethyltetracycline, and 4-epi-6-demethyl-7-chlortetracycline, the dimagnesium and trimagnesium chelates of 4-epi-6-deoxy-6-demethyltetracycline, and the monomagnesium chelate of 4-epioxytetracycline in a reaction inert oxygenated organic solvent therefor at a pH of from about 8.5 to 10, said pH being the apparent pH value of an aliquot portion of said solution diluted with an equal volume of water, and maintaining the resulting solution at a temperature of 20° C. up to 150° C., until said 4-epitetracycline antibiotic is converted to corresponding tetracycline antibiotic.

2. The process of claim 1 wherein tetracycline antibiotic metal chelate is recovered from resulting solution thereof.

3. The process of claim 1 wherein resulting tetracycline antibiotic metal chelate is acidified and a compound selected from the group consisting of tetracycline, 6 - demethyltetracycline, 6 - deoxy - 6 - demethyltetracycline, 6-demethyl-7-chlortetracycline, oxytetracycline, and the acid addition salts thereof is recovered.

4. The process of claim 1 wherein said 4-epitetracycline antibiotic is monomagnesium 4-epioxytetracycline.

5. The process of claim 1 wherein said 4-epitetracycline antibiotic is tricalcium 4-epitetracycline.

6. The process of claim 1 wherein said 4-epitetracycline antibiotic is tricalcium 4-epi-6-deoxy-6-demethyltetracycline.

7. The process of claim 1 wherein said 4-epitetracycline antibiotic is tricalcium 4-epi-6-demethyl-7-chlortetracycline.

8. The process of claim 1 wherein said 4-epitetracycline antibiotic is tricalcium 4-epi-6-demethyltetracycline.

9. The process of claim 1 wherein said 4-epitetracycline antibiotic is trimagnesium 4-epi-6-deoxy-6-demethyltetracycline.

10. The process of claim 1 wherein said 4-epitetracycline antibiotic is formed in situ in said solvent.

11. The process of claim 1 wherein said 4-epitetracycline antibiotic is a component of a mixture with corresponding tetracycline of antibiotic, said mixture containing at least about 5% by weight of said 4-epitetracycline antibiotic.

References Cited in the file of this patent

McCormick et al.: "Journal American Chemical Society," vol. 79, pages 2849–2858 (1957).